July 27, 1965

A. D. ALTEMILLER 3,196,775

TOASTER

Filed June 13, 1963

INVENTOR:
Arthur D. Altemiller,
BY
Bair, Freeman & Molinare
ATTORNEYS.

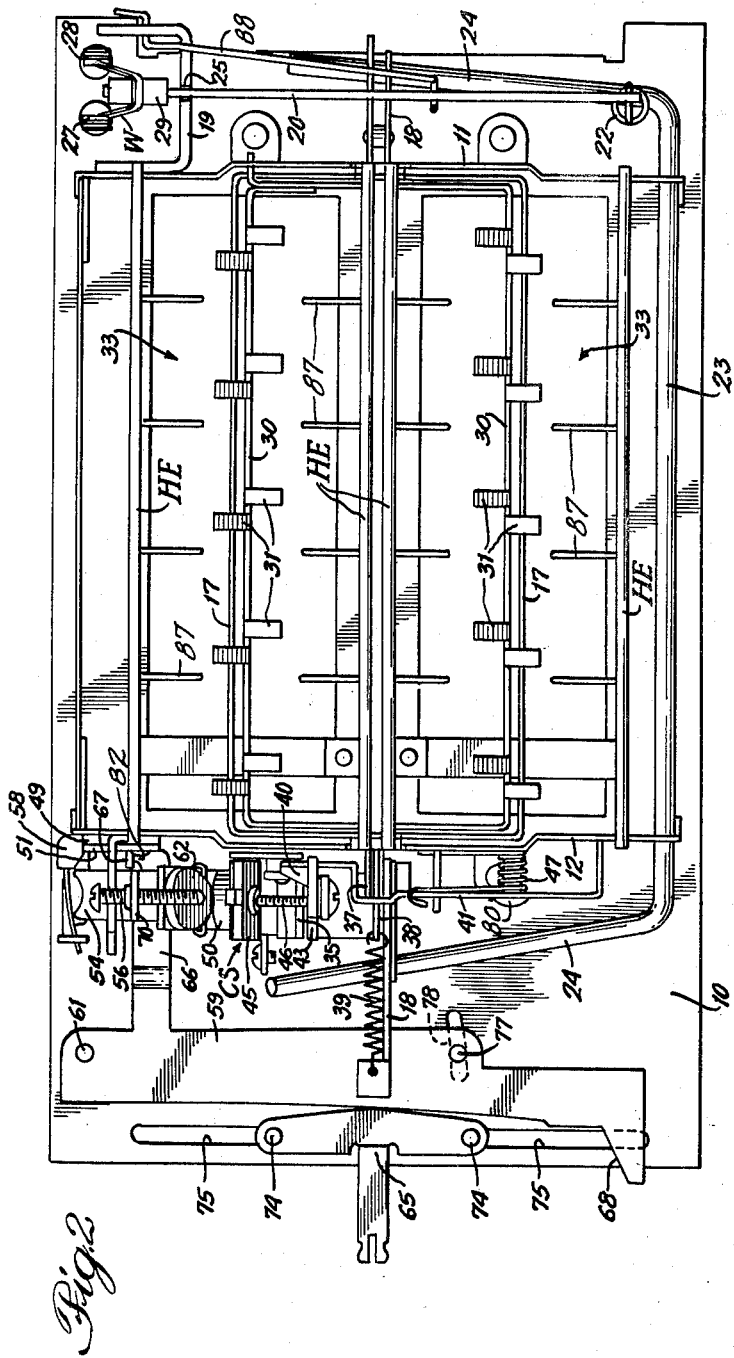

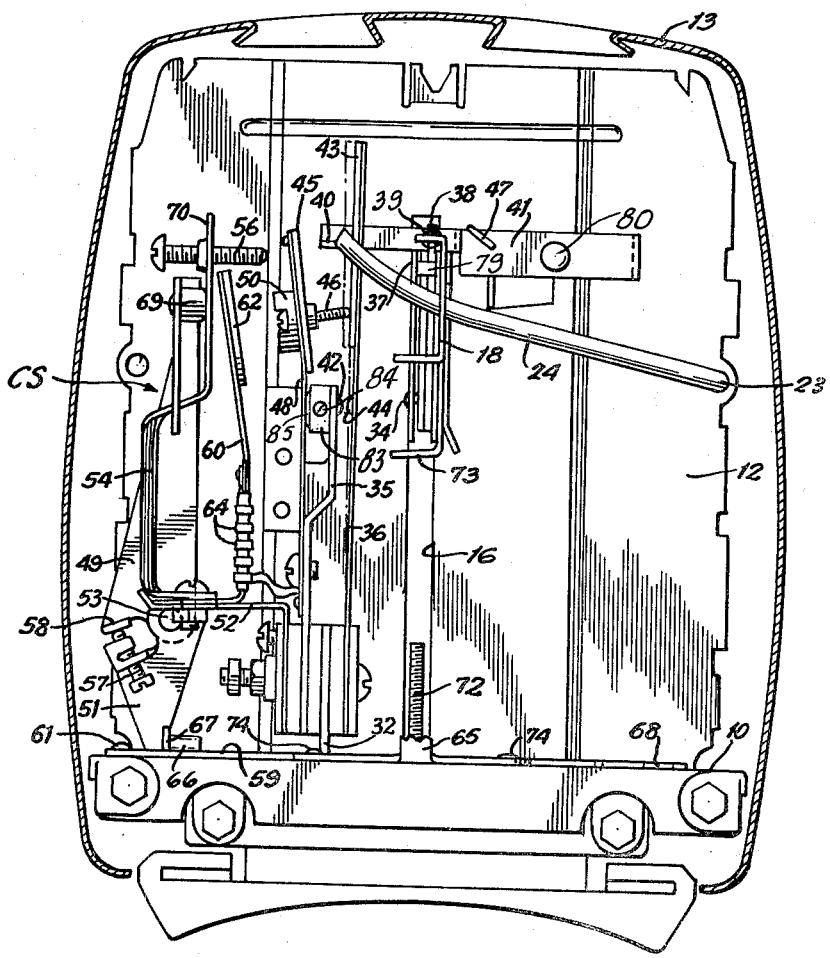

July 27, 1965  A. D. ALTEMILLER  3,196,775
TOASTER
Filed June 13, 1963  5 Sheets-Sheet 4
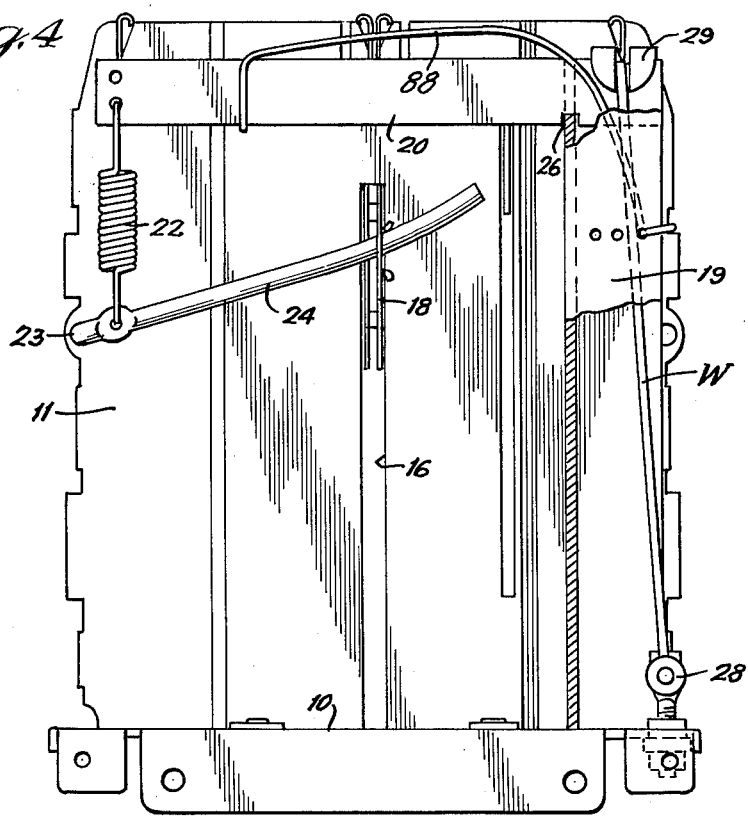
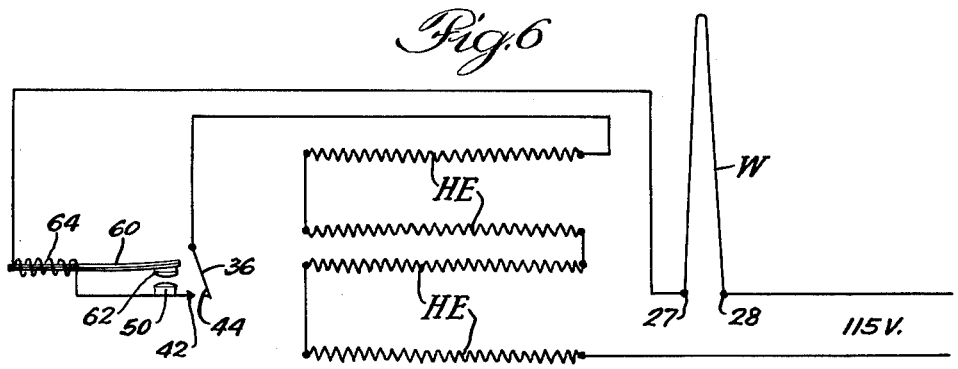
INVENTOR:
Arthur D. Altemiller,
BY
Bair, Freeman & Molinare
ATTORNEYS.

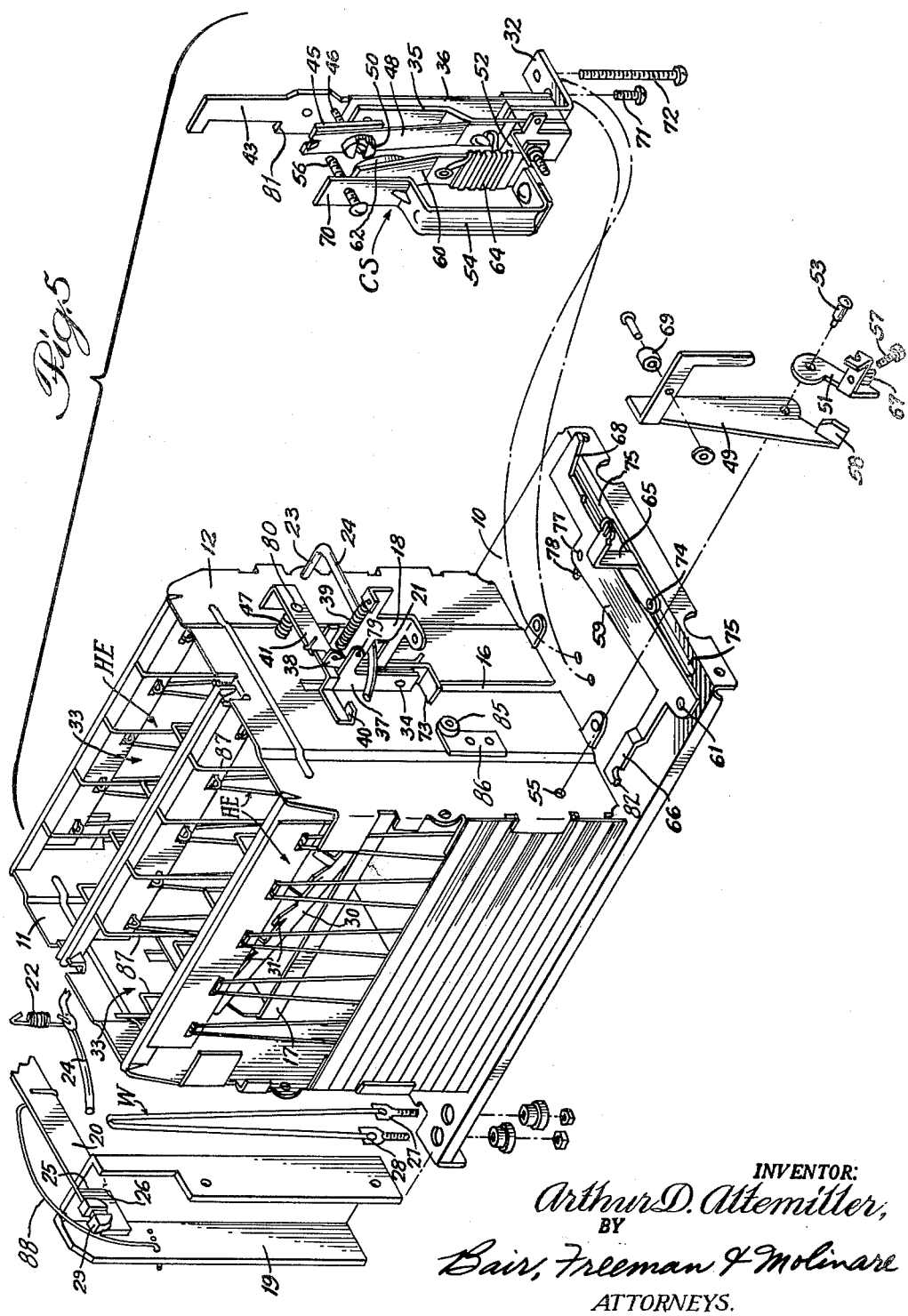

ns
3,196,775
Patented July 27, 1965

3,196,775
TOASTER
Arthur D. Altemiller, St. Louis, Mo., assignor to Knapp-Monarch Company, a corporation of Delaware
Filed June 13, 1963, Ser. No. 288,070
3 Claims. (Cl. 99—329)

This invention relates to an improved toaster for bread and the like having a wire motor for automatic silent lowering and raising of the bread carrier.

This application is a continuation-in-part of application Serial No. 168,379, filed January 24, 1962 for a Toaster.

One object of the invention is to provide a wire motor in the form of a relatively inexpensive single loop resistance wire in the toasting circuit which upon energization expands and effects lowering of the bread carrier, and upon deenergization contracts and effects raising thereof.

Another object of the invention is to provide an automatic toaster having a wire motor in the form of a resistance wire associated with the short arm of a lever, the long arm of which is operatively connected to a bread carrier to hold the bread carrier raised when the wire is cold and to permit the bread carrier to lower when the wire is energized and thereby elongates, whereupon the bread carrier and the bread carried thereby are permitted, due to the weight thereof, to be slowly lowered under the control of the elongating wire.

It is another object of the invention to provide an automatic toaster having a single loop resistance wire associated with lever means for raising and lowering the bread carrier, such lever means including an elongated lever pivotally mounted in the toaster, operatively connected to the resistance wire and interconnected with a connecting lever by spring means, and counterbalancing spring means in the toaster for maintaining the cooperating components in proper relationship to one another.

Still another object is to provide an automatic toaster including a bread carrier having a secondary portion normally in an elevated position and adapted to receive one of two slices of bread whereupon the weight thereof depresses the secondary portion of the bread carrier to automatically start the toasting operation.

A further object is to provide a control switch which is normally latched in an inoperative position, but upon depression of the secondary portion of the bread carrier, is unlatched for closing its contacts thus energizing the heating elements of the toaster and the motor wire.

Still a further object is to provide the control switch with timing means which properly times the toasting cycle, and at the end thereof deenergizes both the heating elements and the wire motor to stop the toasting operation and permit the motor wire to cool for thereby raising the toasted bread to a position of access with respect to the housing of the toaster.

An additional object is to provide toaster mechanism mounted within a toaster housing with a wire motor chamber at one end of the mechanism within the housing and a control switch chamber at the other end of the mechanism within the housing.

Another additional object is to provide the wire motor mounted in its chamber at one end of the bread toasting mechanism and the control switch mounted in its chamber at the other end thereof, said other end being provided with manual toast color adjusting means for adjusting the control switch for the desired color of toast and for opening the control switch manually if desired to interrupt a toasting cycle.

With these and other objects in view, my invention consists in the construction, arrangement and combination of the various parts of my toaster whereby the objects above contemplated are attained, as hereinafter more fully set forth, pointed out in my claims and illustrated in detail on the accompanying drawings, wherein:

FIGURE 2 is a plan view of the toaster with the toaster housing and a control knob of FIGURE 1 removed;

FIGURE 3 is a vertical sectional view through the toaster and shows the left hand end of FIGURE 2;

FIGURE 4 is an end view of the toaster mechanism shown in FIGURE 2 as viewed from the right hand end thereof;

FIGURE 5 is an exploded perspective view showing the interior mechanism of the toaster, the vertical impact-type control device and the wire motor for operating the bread carrier; and FIGURE 6 is an electrodiagrammatic view of the heating elements of the toaster, the toaster period control switch and the wire motor for operating the bread carrier.

Figure 1:
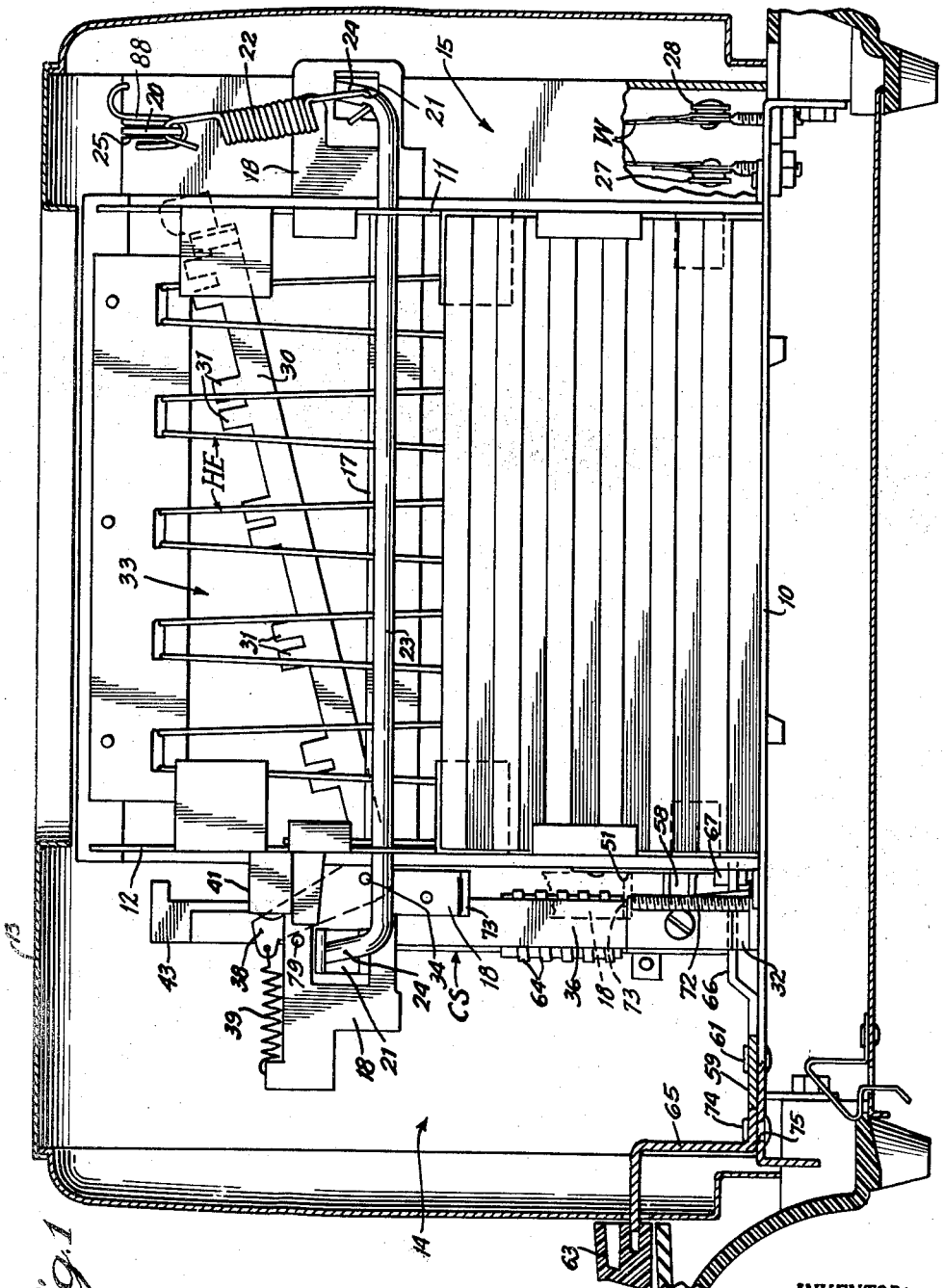
FIGURE 1 is a vertical sectional view through a bread toaster provided with a wire motor for controlling the vertical movements of the bread carrier of the toaster and with a vertical impact-type toasting period control switch.

On the accompanying drawings, I have used the reference numeral 10 to indicate a base member of sheet metal or the like. A pair of upright partitions 11 and 12 are mounted thereon to form a toasting chamber 33 between them as shown in FIGURE 5 within which bread may be toasted in response to electrical energization of a heating element HE. The heating element comprises a suitable grid of resistance wire as usually provided in bread toasters, and the usual bread guide wires 37 are provided. The toasting chamber 33 and the partitions 11 and 12 are enclosed in a housing 13 which as shown in FIGURE 1 thereby provides a control switch chamber 14 at one end of the bread toasting chamber and a wire motor chamber 15 at the other end thereof.

Each partition 11 and 12 has a vertical slot 16 therein through which control arms 18 extend from a rectangular frame-like carriage 17, and these control arms are provided with elongated apertures 21 in the chambers 14 and 15 which loosely receive lever arms 24 of a rock shaft 23. The rock shaft 23 and its lever arms 24 define a connecting lever pivoted on the housing means of the toaster. One of the lever arms is connected by a spring 22 to an elongated wire motor lever 20 pivoted to a channel-shaped wire motor lever support or fulcrum means 19. The manner of pivoting is by means of a vertical slot 25 in the top of support 19, which slot is slightly wider than lever 20 for receiving the lever 20 as shown in FIGURE 5, and for limiting lateral movement or wobble of lever 20. The under edge of lever 20 which engages the fulcrum point on support 19 is notched at 26 to receive the fulcrum therein and to limit longitudinal movement of lever 20 through the slot.

To normally retain the elongated lever 20 in its elevated position illustrated in FIGURES 4 and 5, a motor wire W is provided in the form of an inverted U-shape having its terminal ends anchored to electrical terminals 27 and 28 carried on base 10. The central portion or bight of motor W is looped over saddle-like insulator 29 positioned on the motor lever 20 relatively close to the pivot 25–26, while the spring 22 is connected to lever 20 a much greater distance from the pivot, so that the ratio of leverage is about 1 to 8, as evidenced in FIGURE 4. The spring 22 is a rather heavy closed spring and the coils thereof remain closed during the normal operation of the toaster. This spring is provided as a protection means as will hereinafter appear. Counterbalancing means comprising an elongated spring 88 having one end anchored to a leg of support 19 and the other end hooked under lever 20 between support 19 and spring 22, exerts an upward bias on lever 20 and operates to maintain the lever 20 in proper relation to the parts of the toaster with which it cooperates.

The wire motor disclosed is of the general type shown in my Patent No. 1,925,360 of September 5, 1933, but in the present instance is particularly adapted for operating the bread carriage 17 as will hereinafter appear.

Within the control switch chamber 14 a control switch indicated generally at CS is provided and is of the type generally disclosed in the Patents Nos. 2,778,902 and 3,032,424 except that it is mounted vertically instead of horizontally, and is particularly adapted to the type of toaster herein disclosed. The control switch CS comprises an L-shaped support bracket 32 secured to the base member 10 by means of screws 71 and 72 and having an ear 83 secured by a screw 84 (see FIGURE 3) to an insulator 85 (see FIGURE 5) mounted on a bracket 86. Mounted upon the bracket 32 are contact arms 35 and 36 carrying suitable contacts 42 and 44 as shown in FIGURE 3 which constitute the main switch for the heating elements HE and the motor wire W of the toaster. Arm 36 is a leaf spring and under normal conditions with the bread carriage 17 in its up position, the contacts 42 and 44 are spaced apart. The contact arm 35 has mounted thereon a leaf spring 48 which carries thereon a magnet 50. There is also provided carried on the bracket 32 an angle-shaped arm 52 of resilient leaf spring material. The spring arm 52 carries a relatively rigid laterally extending arm 54 which carries at the upper end thereof an adjusting screw 56. The spring arm 52 also supports an upwardly extending bimetal 60 which carries a keeper armature 62 and which has a portion thereof wound with a heater 64 of resistance wire. The various parts which are mounted on the bracket 32 are appropriately insulated from each other and from the frame of the toaster as is well known in the art and as disclosed in Patent No. 2,778,902.

The screw 72 serves as a stop for the carriage 17 by engagement of a finger 73 of one of the control arms 18 therewith as shown dotted in FIGURE 1.

A rectangular frame 30 (see FIGURE 2) is provided with fingers 31 to support two slices of bread in the toasting chamber 33. The frame 30 is pivoted at 34 to a bracket 37 of the carriage 17 and has within the control switch chamber 14, a latch arm 38. A spring 39 normally biases the frame 30 and the fingers 31 to an upwardly sloping position such as illustrated in FIGURES 1 and 5 against a stop pin 79.

A contact latch 41 is loosely pivoted on a headed stud 80 extending from the partition 12 as shown in FIGURES 2 and 5 and has a latch finger 40 extending therefrom and adapted to engage a strip of insulation 43 on the contact arm 36 to hold the contacts 42 and 44 separated as shown by solid lines in FIGURE 3. The latch 41 is constrained downwardly against a shoulder 81 (see FIGURE 5) of the insulation 43 by a spring 47. When the latch finger 40 is moved toward the partition 12 it will disengage the insulation 43 to permit the leaf spring 36 to assume its normal position shown by dot-and-dash lines in FIGURE 3 wherein the contacts 42 and 44 are closed.

The leaf spring 48 is provided with an impact mass 45 carrying a screw 46. The keeper armature 62 is made of ferrous material for attraction by the magnet 50 for a purpose which will hereinafter appear. The resistance wire 64, when energized, heats the bimetal 60 thus causing it to warp for a control function during the operation of the toaster. The magnet 50 and the keeper armature 62 constitute electrical contacts for shunting out the heater 64 as shown diagrammatically in FIGURE 6.

A pair of adjusting arms 49 and 51 are pivoted on a pivot pin 53 mounted in a perforation 55 of the partition 12. A toast color adjusting screw 57 threads through the arm 51 and strikes an extension 58 of the arm 49 (see FIGURE 3) thus rotating the arm 49 clockwise about the pivot 53 and this pushes the rigid arm 54 by contact of an insulator 69 on the arm 49 therewith against the tension of the resilient arm 52 so as to effect a setting for the timing of the toasting operation. The screw 56 serves as a compensation adjustment screw which is preset to provide the proper cool-off gap or motion for the bimetal 60 as this affects the color of succeeding loads of toast.

A camming lever 59 is pivoted at 61 to the base 10 (see FIGURE 5) so that, as a color control knob 63 (see FIGURE 1) or color adjusting arm 65 on which it is mounted is moved to the left or to the right, it causes the camming lever 59 to rotate about the pivot 61 and thus provide manual toast color control. The arm 65 is slidable along a track of pin and slot construction 74–75 shown in FIGURE 2. Spaced from the pivot 61, the camming lever 59 has a pin and slot connection 77–78 with the base 10. As the camming lever 59 pivots around the pivot 61, the end 82 of its rearward extension 66 engages the lower end 67 of the adjusting arm 51 to provide for this color control. When the color control knob 63 is moved all the way to the right end of its limit of travel, it causes the right end of the color adjusting arm 65 to push against the angular edge 68 of the camming lever 59 so as to push the camming lever backward a considerable amount. This motion is translated through the adjusting arms 49 and 51 to effect considerable movement to the right of the insulator 69 and this pushes extension 70 of the rigid arm 54 to the right, which motion causes the entire upper end of the switch assembly CS to move clockwise or to the right so that insulator 43 is locked behind the right side of the latch finger 40 thus opening the main contacts 42 and 44. In other words, pushing knob 63 to the far right effects manual release of the toaster in the event that a person wishes to interrupt the toasting cycle.

From the foregoing specification, it will be obvious that I have provided a novel application of a thermal motor and simple mechanical linkage therefor in a silent, automatic, bread carrier type of toaster. The advantage of the vertical switch is that it is mounted in a particular manner with respect to the rest of the toaster mechanism so that the entire construction is very simple and practical to manufacture. It is also particularly adapted to the type of toaster disclosed so as to be accommodated in the chamber 14 at one end of the toaster while the wire motor is accommodated in the chamber 15 at the other end thereof.

PRACTICAL OPERATION

In the operation of my toaster, slices of bread are placed in the toasting chamber 33 on the fingers 31 of the rectangular frame 30, and the weight of the bread tilts this frame to a level position against the tension of the spring 39. This results in the latch arm 38 pushing the contact latch 41 toward the partition 12 so that its latch finger 40 disengages the insulation 43 of the contact arm 36. The contact arm springs toward the left to the dot-and-dash line position shown in FIGURE 3 which closes the contact 44 against the contact 42 to establish the electric circuit for energizing the heating element HE and the motor wire W as obvious from an inspection of FIGURE 6. As the wire W heats up it expands, thus permitting its upper end to be pulled upwardly by the downward pressure on the wire motor lever 20 produced by the weight of the bread, the frames 17 and 30 and the lever arms 24 which, through the spring 22, pull downwardly on the long end of the lever 20 thus raising its short end having the insulator 29 thereon. The rock shaft 23 rotates in its bearings as its lever arms move downwardly and keeps the frames 17 and 30 level so that there is no binding to interfere with the downward movement of the bread. Such downward movement is relatively slow due to the gradual expansion of the wire W and the resisting force of spring 88, and is an entirely silent operation as compared with solenoids or other devices for depressing the bread carriers.

The function of the spring 22 is simply to protect the wire W from exceeding its elastic limit if someone should push the bread and thereby the bread carrier down by hand when the toaster is not energized. Under such exceptional stress the spring stretches to an open-coil position rather than applying excessive tension on the wire W.

The resistance wire 64 on the bimetal 60 also heats as soon as the main contacts 42 and 44 close causing the bimetal to deflect toward the magnet 50 until about two-thirds of the toasting time has expired whereupon the keeper armature 62 is attracted to the magnet to shunt out the bimetal heater 64. The heater 64 thereupon cools to cause the bimetal to deflect counterclockwise towards its cold position. In so doing, it carries the magnet 50 along with it, also the leaf spring 48 and the impact mass 45, until the magnet is forced from the keeper armature by spring 48 engaging adjusting screw 56 to pull the keeper armature away from the magnet. When this happens the assembly of the magnet, impact mass and spring blade moves clockwise rapidly and the right end of the screw 46 strikes insulator 43 to drive it by impact to the right until it hooks behind the right side of the latch finger 40 thus opening the contacts 42 and 44 and holding them open. This deenergizes the toasting circuit so that the heating element now cools and the motor wire W also now cools and contracts. As the wire W contracts, it pulls the lever 20 counterclockwise (see FIGURE 5) and causes the bread carrier to rise. It takes a few seconds for the bread carriage to rise just as it takes a few seconds for it to lower at the start of the cycle. The bias forced spring 88 assists wire W to raise the bread carrier. This provides a simple mechanism for an automatic bread carrier type toaster with no noise during operation and relatively few parts.

By mounting the control switch CS vertcially withhin the control switch chamber 14, its latch end (represented by the insulator 43) may be positioned adjacent the top of the chamber to coact with the contact latch 41 which is necessarily at the top of this chamber in order to be actuated by the pivoted frame 30 when at its uppermost position and engaged by the slices of bread inserted into the toaster. The manual color adjustment lever 65 may then operate by sliding along one end of the base 10 and actuate the bell crank shaped camming lever 59–66 which in turn actuates the vertical adjusting arm 49 through the adjusting arm 51. The insulator 69 on the upper end of the arm 49 may thus engage the extension 70 of the rigid arm 54 for transferring the adjustment from the lever 65 to the control switch, and for also adjusting the control switch to stop the toasting cycle at any time desired by cooperation of the color adjusting arm 65 with the angular edge 68 of the camming lever 59. A factory adjustment is then made possible by the adjusting screw 57 which adjusts the angular relation between the two arms 49 and 51. The adjusting screw 56 is also a factory adjustment.

From the foregoing specification, it will be obvious that I have provided a toaster with motor means in the form of a single loop wire motor to silently cause depression of the bread carriers and likewise silent elevation thereof at the completion of the toasting cycle. The toasting cycle is automatically started by merely the insertion of one or two slices of bread into the toaster, the weight of which unlatches the normally open control switch so that it closes to start the toasting cycle and thereafter operates to time the same on the "heat up-cool down" principle. The control switch is vertically mounted in order to reach the elevated contact latch 41, and the combination of levers 59, 51 and 49 mounted on the base 10 and on the partition 12 transfer manual color control adjustments from the control knob 63 to the control switch.

By locating the hot-wire motor W outwardly of partition 11, the bread being toasted in chamber 33 is subjected to toasting heat from only the heating element HE. At the same time, the motor W is shielded from objects that may be inserted into chamber 33. The support 19 is generally channel-shaped along its upward extent and the motor W is located generally between the legs of the channel, thereby further shielding and protecting the motor.

Some changes may be made in the construction and arrangement of the parts of my toaster without departing from the real spirit and purpose of my invention, and it is my intention to cover by my claims any modified forms of structure or use of mechanical equivalents which may reasonably be included within their scope.

I claim as my invention:

1. An improved automatic toaster of the type that includes wire motor means which expands when electrically energized to permit lowering of a bread carrier and which contracts when deenergized to effect raising of the bread carrier; said improved toaster comprising in combination: a base, housing means on said base defining a first chamber means for toasting bread therein and second chamber means separate from said first chamber means for a bread carrier actuating mechanism therein, there being within said first chamber means a bread carrier having a vertically movable control portion thereon projecting into said second chamber means, and electrically energized toasting means; there being within said second chamber a fulcrum means supported on said base to one side of the path of said vertically movable control portion and providing a fulcrum at a level in a plane spaced above the uppermost range of movement of said movable control portion and distally of the base, an elongated lever pivotally mounted on said fulcrum and defining a short arm disposed to one side of said fulcrum so that the fulcrum is positioned between said short arm and the plane of movement of said control portion, and a long arm extending laterally of said fulcrum and above and distally to the other side of the plane of movement of said control portion, a connecting level pivoted on said housing means and engaging said control portion of said carrier, a spring connected at one end to said long arm and at the other end to the connecting lever offset from the pivot of said connecting lever so that raising movement of the long arm is transmitted directly to the connecting lefer through the spring means, a counter-balance spring anchored to the housing means and engaging the long arm of the elongated lever, and a single-loop motor wire constructed and arranged to provide the force necessary to effect raising of the bread carrier and having its lower end rigidly anchored on the base and with its bight directly operatively enaging the short arm of the elongated lever.

2. An improved automatic toaster comprising in combination: a base, housing means on said base defining a first chamber means for toasting bread therein and second chamber means separate from said first chamber means, there being within said first chamber means a bread carrier having a vertically movable control portion thereon projecting into said second chamber means, and electrically energized toasting means; there being within said second chamber bread carrier actuating mechanism comprising fulcrum means supported on said base to one side of the path of said vertically movable control portion and providing a fulcrum at a level in a plane spaced above the uppermost range of movement of said movable control portion and distally from said base, an elongated lever pivotally mounted on said fulcrum and defining a short arm disposed to one side of said fulcrum so that the fulcrum is positioned between said short arm and the plane of movement of said control portion, and a long arm extending laterally of said fulcrum and above and distally to the other side of the plane of movement of said control portion, connecting lever means pivoted on said housing means and engaging said control portion of said bread carrier, a tension spring connected at one end to the distal end of said long arm and at the other end to the connecting lever means at a point offset from the pivot of said connecting lever means, a counterbalance spring anchored to the housing means and engaging the long arm of the lever, and a single-loop inverted elongated U-shaped motor wire which expands when electrically energized to permit lowering of the bread carrier and which contracts when deenergized to effect raising of the bread carrier, said motor wire being constructed and arranged to provide sufficient change of length to produce the force necessary to effect raising of the bread carrier and being rigidly anchored at its lower ends on the base and having its bight directly operatively engaging the short arm of the elongated lever so as to exert the raising force directly upon the pivotally mounted lever, the said tension spring functioning to protect the wire motor in the event the bread carrier is inadvertently actuated when the toaster is deenergized.

3. A device as in claim 1 wherein the connecting lever is spaced below the said long arm, and the spring is an elongated coiled tension spring.

References Cited by the Examiner

UNITED STATES PATENTS

| | | | |
|---|---|---|---|
| 2,616,358 | 11/52 | Stevenson et al. | 99—329 |
| 2,622,505 | 12/52 | Olson et al. | 99—329 |
| 2,655,860 | 10/53 | Smith | 99—329 |
| 2,667,828 | 2/54 | Koci | 99—329 |
| 2,835,192 | 5/58 | Sivacek | 99—329 |
| 2,920,550 | 1/60 | Schmall et al. | 99—329 |
| 3,032,424 | 5/62 | Visos | 99—329 |

ROBERT E. PULFREY, *Primary Examiner.*

LAWRENCE CHARLES, *Examiner.*